Inventors:
Leonard W. Niedrach,
William N. Stoddard, Jr.,
by Paul R. Webb, II
Their Attorney.

United States Patent Office 3,719,575
Patented Mar. 6, 1973

3,719,575
SENSOR WITH ION EXCHANGE RESIN ELECTROLYTE
Leonard W. Niedrach and William H. Stoddard, Jr., Schenectady, N.Y., assignors to General Electric Company
Filed Oct. 15, 1970, Ser. No. 80,903
The portion of the term of the patent subsequent to Nov. 21, 1989, has been disclaimed
Int. Cl. G01n 27/46
U.S. Cl. 204—195 P                         3 Claims

ABSTRACT OF THE DISCLOSURE

A sensor has a rigid electrically insulating matrix, at least a pair of generally parallel, elongated current collectors embedded in the matrix, the current collectors electrically insulated from each other and opposite ends exposed, an electrochemically active region in electrical contact with the exposed end of each current collector at one end of the matrix, an electrical lead in contact with each current collector at the opposite end of the matrix, an ion exchange resin electrolyte contacting both electrochemically active regions, and an outer sheath of diffusion barrier material encapsulating the electrochemically active regions and the electrolyte. Methods of manufacturing such sensors are also described.

---

Reference is made to copending patent application entitled "Sensor and Method of Manufacture" filed Sept. 4, 1970, and given Ser. No. 69,650, which describes and claims a sensor including an ion exchange resin electrolyte and methods of manufacture. Reference is also made to our copending patent application entitled "Sensor and Method of Manufacture" filed concurrently herewith as Ser. No. 80,902, which describes and claims a sensor including at least a pair of parallel electrodes in a rigid, electrically insulating matrix, and methods of manufacture. These copending applications, in the names of Leonard W. Niedrach, Leonard W. Niedrach and William H. Stoddard, Jr., respectively, are assigned to the same assignee as the present application.

This invention relates to sensors and to methods of manufacturing such sensors and, more particularly, to polarographic oxygen sensors employing a rigid, electrically insulating matrix and to methods of manufacturing such sensors.

Sensors are employed to determine the content of a specific substance in a fluid atmosphere. For example, a sensor might be employed to determine the content of oxygen, or carbon dioxide in a sample, or its pH.

Polarographic oxygen sensors are known in the prior art for determining oxygen content of a sample. In operation, such a sensor determines the transfer rate of oxygen through a diffusion barrier by measuring the related limiting reduction current at a polarized electrode. U.S. Letters Patent describing such sensors include No. 2,913,386—Clark issued Nov. 17, 1959 for "Electrochemical Device for Chemical Analysis," No. 3,415,730—Haddad issued Dec. 10, 1968 for "Flexible Electrode Assembly" and No. 3,449,231—Adams et al. issued June 10, 1969, for "Oxygen Sensor With Rhodium Cathode."

Our present invention is directed to an improved miniaturized sensor which is suitable for biomedical, environmental control, and other applications.

The primary objects of our invention are to provide a rugged, accurate miniaturized sensor and method of manufacture.

In accordance with one aspect of our invention, a sensor comprises a rigid, electrically insulating matrix, at least a pair of generally parallel, elongated current collectors embedded in the matrix, the current collectors electrically insulated from each other and opposite ends exposed, an electrochemically active region in electrical contact with the exposed end of each current collector at one end of the matrix, an electrical lead in contact with each current collector at the opposite end of the matrix, an ion exchange resin electrolyte contacting both electrochemically active regions, and an outer sheath of diffusion barrier material encapsulating the electrochemically active regions and the electrolyte.

Figure 1:
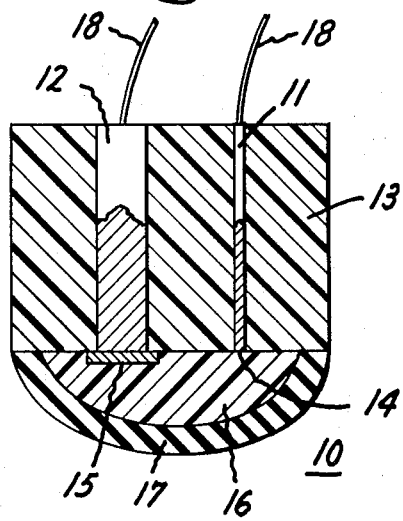
Figure 2:
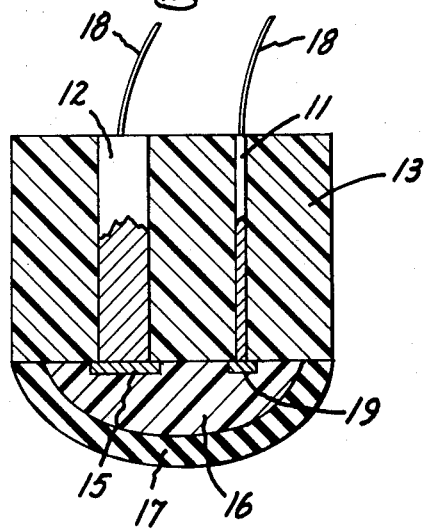

These and various other objects, features and advantages of the invention will be better understood from the following description taken in connection with the accompanying drawing in which:

FIG. 1 is a sectional view of a portion of a polarographic oxygen sensor made in accordance with our invention; and FIG. 2 is a sectional view of a portion of a modified sensor.

In FIG. 1 of the drawing, there is shown generally at 10 a portion of a sensor embodying our invention. Sensor 10 is shown with a first elongated current collector 11 in the form of a silver wire and a second elongated current collector 12 in the form of another silver wire. These elongated current collectors, which are generally parallel and spaced apart, are embedded in a rigid, electrically insulating matrix 13 of a material such as a cured epoxy resin. Matrix 13 insulates electrically one current collector from the other current collector while both opposite ends of the current collectors are exposed. A first electrochemically active region 14 consists of the exposed cross-section of current collector 11. This active region 14 provides the sensing electrode or cathode which is in electrical contact with current collector 11. A second electrochemically active region 15 of cadmium is in electrical contact with the adjacent exposed end of current collector 12 to provide the counter electrode or anode. For example, the cadmium is electroplated onto a silver surface which has been painted on a portion of the end of the matrix and makes contact with the exposed end of current collector 12.

An ion exchange resin electrolyte 16 of quaternized polystyrene in its bicarbonate form contacts both electrochemically active regions 14 and 15. An outer sheath 17 of oxygen diffusion barrier material of Viton hexafluoropropylene-vinylidene fluoride rubber encapsulates active regions 14 and 15, and electrolyte 16. An electrical lead 18 is in contact with each of the current collectors 11 and 12 at the opposite end of matrix 13. Leads 18 may be continuations of current collectors 11 and 12. The resulting polarographic oxygen sensor can be used for clinical or other analysis. An appropriate value resistance with an ammeter and, if necessary, a power supply in series can be connected to the opposite ends of leads 18. The electrical output from the sensor in operation will be a linear function of the oxygen partial pressure of the environment.

In FIG. 2 of the drawing, there is shown a portion of a modified polarographic oxygen sensor which is generally similar to the sensor described above for FIG. 1. However, the first electrochemically active region is in the form of silver metal 19 which has been painted on a portion of the end of the matrix and makes contact with the exposed end of first current collector 11 to be in electrical contact therewith. An ion exchange resin electrolyte 16 of quaternized polystyrene in its bicarbonate form contacts both electrochemically active regions 15 and 19. An outer sheath 17 of oxygen diffusion barrier material of Viton hexafluoropropylene-vinylidene fluoride rubber encapsulates active regions 15 and 19, and electrolyte 16. An electrical lead 18 is in contact with each of the current collectors 11 and 12 at the opposite end of matrix 13.

We found that we can form improved sensors, and particularly, the above described polarographic oxygen sensors by embedding at least a pair of generally parallel, elongated current collectors in a curable electrically insulating matrix material and curing the matrix material to form a rigid matrix in which the current collectors are electrically insulated from each other. The matrix can also be preformed with openings therethrough for the current collectors. The collectors may then be sealed into the openings with a suitable adhesive such as an epoxy resin. An ion exchange resin electrolyte is applied at the one end of the matrix thereby contacting both electrochemically active regions. An outer sheath of diffusion barrier material is applied thereby encapsulating the electrochemically active regions and the electrolyte.

We found that polymer resins for producing composites of fibers and polymer binder can be used in our method which resins are of suitable resistance to chemical attack, possess metal wetting characteristics, etc. Such suitable polymer resin binders include epoxies, polyimides, polyesters, etc.

We found that a current collector that is also to serve as the cathode as in FIG. 1 can be made of silver, gold, platinum or other noble metals. When serving only as a current collector as in the case of the cathode of FIG. 2 and the counter electrode of both FIG. 1 and FIG. 2 the current collector can be made of a wide variety of base metals, such as copper, iron, nickel, lead, cadmium, etc. as well as of noble metals. The diameters of the two current collectors need not be identical. If the current collectors are to be bonded into a preformed matrix, various materials for this purpose can be used such as epoxy resins, alkyd resins, polystyrene, etc.

Generally, these sensors are divided into two types. The first type employs a cation exchange resin electrolyte preferably in the form of a strong acid while the second type employs an anion exchange resin electrolyte, preferably in a buffered, neutral form or in the form of a strong base.

A suitable first electrochemically active region which can be employed for the counter electrode or anode is hydrided palladium for the acid basic or neutral type sensor. Antimony with antimony surface oxide can be employed in acid or neutral type sensors. Base metals such as Cu, Fe, Ni, Pb, Cd, etc. can be employed in neutral or basic types. Suitable second electrochemically active regions which can be employed for the sensing electrode or cathode include platinum, rhodium and iridium for the acidic type sensor, and platinum, rhodium, iridium, gold and silver for the basic and neutral type sensor. It will, of course, be appreciated that various other electrochemically active regions can be employed.

The electrochemically active regions may be applied in a number of ways; e.g. by painting, lacquering, sputtering, electroless plating, etc. When applied as paints or lacquers suitable binders should be employed to make good bonds with the matrix and current collector materials. Alternatively a preliminary, conducting layer may be applied and the active region formed thereon by electrodeposition of the appropriate material.

If the desired metal itself is incorporated into a suitable paint or lacquer, the active region forms directly as the paint or lacquer dries. On occasion there may be advantages to employing paints or lacquers in which the desired metal is present as its oxide or some other compound. In such a case the compound may be reduced to the metallic state prior to addition of the electrolyte or diffusion barrier. For example, an active region of cadmium could be applied in the form of a lacquer containing cadmium oxide. After evaporation of the solvent the cadmium could be reduced electrolytically.

When hydrided palladium is to be used as an active anode material, it is desirable to apply it as palladium metal, preferably incorporated into a paint or lacquer. It can subsequently be hydrided electrochemically preferably after addition of the electrolyte layer.

Various exchange membrane materials are known. For example, reference is made to such preparation and properties of a number of different types of such resins in U.S. Pat. No. 3,134,697 entitled "Fuel Cell" which issued in the name of Leonard W. Niedrach and is assigned to the same assignee as the present application.

Sulfonated polyphenylene oxide, sulfonated poly(2,6-diphenyl-phenylene oxide) and sulfonated capped poly-(2,6-diphenyl-phenylene oxide) in the acid form are suitable electrolytes for the cation exchange resin type sensor. With the anion exchange resin type sensor, suitable electrolytes include a terpolymer of methyl methacrylate, divinyl-benzene and 2-hydroxy-2-trimethylammonium propyl methacrylate and quaternized polystyrene. Of the anion exchange resin electrolytes we prefer quaternized polystyrene in a phosphate buffer form when hydrided palladium is used as the counter electrode. When other counter electrode materials are used we prefer the quaternized polystyrene electrolyte in the bicarbonate form.

A quaternized polystyrene is a polystyrene which is partially converted to a quaternary amine derivative. The manufacture of this electrolyte involves the chloromethylation and subsequent quaternization of polystyrene as shown in Equation 1.

Equation 1

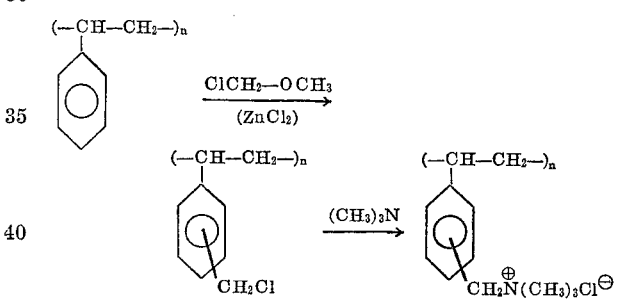

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain values which correspond to optimal chlorine contents of 3.6–4.2% for the chloromethylated but not quaternized resin, about 1 chloromethyl group for every 8 repeat units, with the wider tolerance of 3.3–4.5% Cl for a satisfactory product. Polystyrene is generally chloromethylated in chloromethylmethylether as the alkylating agent with zinc chloride as a catalyst, without use of a solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No crosslinking is observed under these conditions and the reaction time of about 3 hours is sufficiently long that the time elapsed between monitoring the progress of the reaction and quenching has little effect on the product.

After the reaction mixture has attained the desired viscosity, the reaction is quenched by adding a specified amount of 20% water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chloromethyl polystyrene is accomplished by the reaction of chloromethyl polystyrene with trimethylamine according to Equation 2.

Equation 2

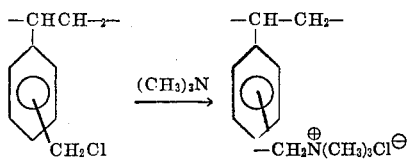

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20% solution in methanol. The product precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, sticky white gum which hardens gradually upon prolonged stirring with the precipitant as the methanol is being extracted from the resin. The material is broken up mechanically and dried at 40–50° C. in vacuo.

Various diffusion barrier materials are suitable as an outer sheath to encapsulate the active regions and the electrolyte. The diffusion barrier material must be electrically insulating and have an appropriate permeability coefficient for the particular substance, such as oxygen, to be sensed. Suitable materials include polypropylene oxide, Viton hexafluoropropylene-vinylidene fluoride rubber, Adiprene urethane rubber, silicone rubbers, etc.

We found that after the above-described sensor matrix has been formed, or a preformed matrix has been provided, and the respective current collectors and active regions have been applied thereto, an ion exchange resin electrolyte can be applied to the one end of the matrix thereby contacting both electrochemically active regions. This can be accomplished by contacting one end of the matrix with an electrolyte solution such as a solution of quaternized polystyrene in chloroform-methanol thereby forming ion exchange resin electrolyte 14 upon evaporation of solvent. This is subsequently converted to the desired buffer form by immersion in an appropriate buffer solution for at least 30 minutes.

If the counter electrode 12 is to be hydrided palladium formed from palladium already in the active region, it may be formed at this point. In such as case the sensor would be immersed in a dilute phosphate buffer at pH 7. After the ion exchange electrolyte had equilibrated for a period of 30 to 60 minutes a current of about 0.1 milliampere for about 3 hours would be forced between the active region 15 and an auxiliary platinum electrode which is immersed in the same buffer solution. The device is then rinsed briefly in water and partially dried in a flowing nitrogen atmosphere. An outer sheath of Viton hexafluoropropylene-vinylidene fluoride rubber, an oxygen diffusion barrier material with electrical insulation properties is then applied to encapsulate electrically active regions 14 and 15, and electrolyte 16. This is accomplished by immersion in a Viton solution in acetone and subsequently removing the solvent by evaporation in ambient air.

If counter electrodes other than palladium hydride are to be used they will normally be in the appropriate form prior to the application of the electrolyte. In such cases, immediately after the equilibration with the appropriate buffer, normally a bicarbonate buffer, the device is rinsed briefly in water and partially dried in air, following which the Viton hexafluoropropylene-vinylidene fluoride rubber diffusion barrier is applied as above.

The resulting polarographic oxygen sensor can be used for clinical or other analysis. An appropriate resistance with an ammeter and, if necessary, power supply in series is connected to the respective leads 18. The electrical output from the sensor in operation will be a linear function of the oxygen partial pressure of the environment.

Examples of polarographic oxygen sensors made in accordance with our invention are as follows:

EXAMPLE 1

A polarographic oxygen sensor was formed in accordance with the above description and generally in the form shown in FIG. 1 of the drawing.

A preformed matrix of polymethylmethacrylate with two parallel openings therethrough for the current collectors was employed. Two 1 mil thick silver wires, the respective current collectors, were embedded in said openings by means of a curable epoxy resin, D.E.R. 332, which is manufactured by Dow Chemical Company, Midland, Mich. The resin was allowed to cure overnight at room temperature. The resulting structure was a rigid matrix with dimensions of ½ inch diameter by 2 inches long. The current collectors were spaced apart approximately ¼ inch. The working end was ground flat. The opposite ends of the current collectors were connected to respective electrical leads. The cross-section of the silver wire formed the first electrochemically active region. Polymethylmethacrylate bonded silver paint was then applied to make contact with the second silver current collector and to form a 1/16 inch wide ring of ¼ inch mean diameter on the matrix and encircling the first current collector. Cadmium metal was then electrodeposited thereon by employing a commercial cadmium cyanide bath and a current of 0.5 milliampere for 10 minutes to form the second electrochemically active region. The working end of the matrix was immersed into a chloroform-methanol solution of quaternized polystyrene in the chloride form having an ion exchange capacity of one milliequivalent per gram. The electrolyte was then converted to a bicarbonate form. The conversion of the electrolyte was accomplished by immersing the structure in a 0.1 M potassium bicarbonate solution for a period of two hours. The structure was then rinsed briefly in water and partially dried in air at ambient temperature.

The same end of the matrix was immersed in a solution of Viton hexafluoropropylene-vinylidene fluoride rubber in acetone. The solvent was then removed by evaporation for 30 minutes in ambient air to form an oxygen diffusion barrier material with electrical insulation properties, covering both the active regions and the electrolyte. The resulting structure was a polarographic oxygen sensor.

EXAMPLE 2

The polarographic oxygen sensor made in accordance with Example 1 above was tested by being immersed under water in a one inch diameter cylinder which was fused onto a porous fritted disc. Streams of oxygen-containing gas through the disc kept the water saturated with gas at the desired partial pressure of oxygen. The container for the sensor which was immersed in a water bath was maintained at 25° C. With the sensing electrode biased to —0.5 volt versus the counter electrode using a battery power supply, the electrical output was about .73 picoampere per millimeter of oxygen.

While other modifications of the invention and variations thereof which may be embraced within the scope of the invention have not been described, the invention is intended to include such as may be embraced within the following claims.

What we claim as new and desire to secure by Letters Patent of the United States is:

1. A sensor comprising a rigid, electrically insulating matrix, at least a pair of generally parallel, elongated current collectors embedded in the matrix, the current collectors are electrically insulated from each other and have opposite ends exposed, an electrochemically active region in contact with each current collector at a first exposed end of the matrix, the electrochemically active regions in generally parallel relationship, an electrical lead in contact with each current collector at the opposite second exposed end of the matrix, an ion exchange resin electrolyte contacting both electrochemically active regions adjacent the first exposed end of the matrix, and an outer sheath of diffusion barrier material encapsulating the electrochemically active regions and the electrolyte adjacent the first exposed end of the matrix.

2. In a polarographic oxygen sensor as in claim 1, in which the outer sheath is an oxygen diffusion barrier material.

3. In a polarographic oxygen sensor as in claim 1, in which the first current collector is silver, the first electrochemically active region is silver, the second current collector is silver, the second electrochemically active region is cadmium, the electrolyte is quaternized polystyrene in its bicarbonate form, and the oxygen diffusion barrier is hexafluoropropylene-vinylidene fluoride rubber.

References Cited
UNITED STATES PATENTS

| | | | |
|---|---|---|---|
| 2,913,386 | 11/1959 | Clark | 204—195 |
| 3,134,697 | 5/1964 | Niedrach | 136—86 F |
| 3,227,643 | 1/1966 | Okun et al. | 204—195 |
| 3,334,039 | 8/1967 | Vlasak | 204—195 |
| 3,382,105 | 5/1968 | McBryar et al. | 136—86 F |

TA-HSUNG TUNG, Primary Examiner

U.S. Cl. X.R.

117—232